United States Patent [19]

Klenk et al.

[11] Patent Number: 5,231,869
[45] Date of Patent: Aug. 3, 1993

[54] METHOD AND ARRANGEMENT FOR DETERMINING MISFIRES IN AN INTERNAL COMBUSTION ENGINE

[75] Inventors: Martin Klenk, Backnang; Winfried Moser, Ludwigsburg, both of Fed. Rep. of Germany

[73] Assignee: Robert Bosch GmbH, Stuttgart, Fed. Rep. of Germany

[21] Appl. No.: 819,079

[22] Filed: Jan. 10, 1992

[30] Foreign Application Priority Data

Jan. 10, 1991 [DE] Fed. Rep. of Germany ........ 4100527

[51] Int. Cl.$^5$ ........................................... G01M 15/00
[52] U.S. Cl. ..................................................... 73/116
[58] Field of Search .................. 73/116, 117.3, 35 K; 123/435, 436, 419, 425

[56] References Cited

U.S. PATENT DOCUMENTS

| | | | |
|---|---|---|---|
| 4,788,956 | 12/1988 | Suzuki et al. | 73/116 |
| 4,928,228 | 5/1990 | Fujimoto et al. | 73/117.3 |
| 4,987,771 | 1/1991 | Iwata | 73/117.3 |
| 5,044,195 | 9/1991 | James et al. | 73/117.3 |
| 5,044,336 | 9/1991 | Fukui | 73/116 |
| 5,105,657 | 4/1992 | Nakaniwa | 73/117.3 |
| 5,109,695 | 5/1992 | James et al. | 73/117.3 |
| 5,125,381 | 6/1992 | Nutton et al. | 73/116 |

FOREIGN PATENT DOCUMENTS 3615547  11/1986  Fed. Rep. of Germany .
3917978  12/1990  Fed. Rep. of Germany .

*Primary Examiner*—Jerry W. Myracle
*Attorney, Agent, or Firm*—Walter Ottesen

[57] ABSTRACT

The invention is directed to a method for determining misfires in an internal combustion engine of a motor vehicle. The determination is discontinued after a misfire under specific further conditions for a pregiven number of ignition strokes. When the misfire determination is not discontinued, then a check is made as to whether simple measurement value relationships apply which make a misfire very improbable. If such measurement value relationships are present, then the actual complicated misfire determination is discontinued. It is of special significance to count ignition strokes, which are counted in order to determine the relative frequency of misfires, only then when the above-mentioned conditions are all satisfied which determine as to whether a condition is present at all in which a determination of the misfire is purposeful. In this way, the decisive frequency determination is not influenced by the count of the ignition strokes which are not at all relevant to misfires. The above-mentioned procedure leads to a shortening of the average computation time because of the interruption of the misfire detection in many cases in which specific conditions are satisfied. Furthermore, the reliability of the detection of misfires is increased in that the final determination of misfires takes place only when specific preconditions are satisfied.

9 Claims, 2 Drawing Sheets 5,231,869

METHOD AND ARRANGEMENT FOR DETERMINING MISFIRES IN AN INTERNAL COMBUSTION ENGINE

FIELD OF THE INVENTION

The invention relates to a method and an arrangement for determining misfires in an internal combustion engine of a motor vehicle.

BACKGROUND OF THE INVENTION

Misfires are problematic in two aspects. On the one hand, they increase the toxic gas content in the exhaust gas already with a misfire frequency of several percent of all ignition strokes and, on the other hand, they endanger the catalyzer with unburnt fuel which is then combusted in the catalyzer. This danger begins when the misfire strokes amount to approximately 10% of the total number of ignition strokes assuming nothing is undertaken to counteract the effect of the misfires. One conventional measure for avoiding damaging effects is to interrupt the metering of fuel to a cylinder having misfires.

Various methods for determining misfires are known such as measuring the ignition signals, the measurement of the combustion pressure, the investigation of noise signals, the optical check for the presence of ignition sparks, the measurement of exhaust gas temperature in the outlet elbow or the investigation of crankshaft speeds within pregiven crankshaft angle sectors.

Most of these methods are quite complicated and require considerable computations. Especially costly microcomputers must be used to obtain acceptable computation times notwithstanding the high complexity of computation.

SUMMARY OF THE INVENTION

In view of the above, it is an object of the invention to provide a method wherein the complexity of computation is reduced without reducing the precision of the determination of the misfires It is another object of the invention to increase the accuracy of the determination. It is also an object of the invention to provide an arrangement for carrying out the method of the invention.

The method of the invention is for determining the misfires in an internal combustion engine in a motor vehicle. In this method, this determination is discontinued starting with the occurrence of pregiven operating conditions of the motor vehicle and especially of the engine until these conditions are no longer satisfied. Preferably, the upward counting of an ignition stroke counter is discontinued during that time span in which the misfire determination is discontinued. The count of the ignition stroke counter operates to determine the frequency of the misfires.

The misfire determination is discontinued while pregiven conditions are satisfied. These pregiven conditions are especially pregiven operating regions such as a short time span after engine start.

Those conditions which are useful are greatly dependent on the susceptibility to disturbance of a particular misfire method. Methods are very slightly susceptible to disturbance wherein special sensors are provided for detecting misfires, that is, ignition voltage sensors, knock sensors, ignition spark sensors or pressure sensors for measuring the pressure in the combustion chamber. The knock and pressure sensors afford the advantage that they determine not only misfires because of an absence of ignition but also misfires because of non-ignitable mixtures. Pressure sensors are less sensitive to disturbance than knock sensors since it is difficult to adjust knock sensors so that they clearly react to the oscillation pattern of a misfire. Often, an oscillation is initiated by a misfire which, even within a few ignition strokes after the misfire, can erroneously lead to the detection of a further misfire. When using such a sensor, it is advantageous to discontinue the misfire determination within several pregiven ignition strokes after the determination of a misfire. Preferably, such a discontinuation over several ignition strokes takes place only then when a misfire occurs after a pregiven number of delay ignition strokes. If a misfire was determined, the misfire determination was then discontinued for several ignition strokes and if a misfire is then immediately again determined before the number of delay ignition strokes is reached, then no further discontinuance of the misfire determination takes place; instead, each following misfire is counted until no misfire occurs at least over the pregiven number of delay ignition strokes. Only then, after a new misfire, is the misfire determination discontinued again for the pregiven number of ignition strokes.

The above-mentioned advantageous configuration of the method of the invention is not only advantageous in connection with knock sensors responding to oscillations but in combination with all misfire detection methods which are sensitive to disturbance. In this context, especially all methods are to be considered which utilize sensors already available on each engine having electronic control, namely, a crankshaft angle sensor. With the aid of such a sensor and a time counter, measurements can be made as to within which time spans pregiven crankshaft angle sectors are passed over. The presence of misfires can be concluded from fluctuations in the measured times for pregiven crankshaft angle sectors. Such methods react sensitively to oscillations of the crankshaft.

Oscillations can be triggered in an engine not only by misfires but also, for example, by forces which are transmitted back to the engine from the drive wheels via the transmission chain when driving over uneven stretches. In order not to erroneously react to oscillations of this kind, an advantageous embodiment of the method of the invention provides that the misfire determination is discontinued as long as the signal from a vibration sensor, preferably an accelerating sensor, indicates that the vehicle travels over uneven ground.

Various methods of determining misfires are quite complex with respect to computations especially those which utilize the signals from the above-mentioned crankshaft angle sensors. However, for these methods, basic conditions can be set up which reliably show that no misfires are present. One such basic condition is, for example, that, at the end of an actual ignition stroke, a higher speed of the crankshaft is present than at the end of the previous ignition stroke. The satisfaction of this condition shows that a misfire is certainly not present. According to an embodiment of the method, the further sequence to determine misfires is therefore discontinued. The measurement signals for the next ignition stroke are then awaited. In this way, considerable computation time is saved.

As already mentioned above, the presence of a certain operating condition can be pregiven as an interrupting condition. There, a short time span after the start of the engine was mentioned. Further conditions dependent upon operating conditions are, for example, very high or very low engine speeds, very rapid and very large load or speed changes and overrun operation.

The arrangement of the invention for determining misfires in an internal combustion engine in a motor vehicle includes at least one means for detecting operating conditions of the motor vehicle; and, means for interrupting the detection of misfires starting with the occurrence of pregiven operating conditions until the pregiven operating conditions are no longer satisfied.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
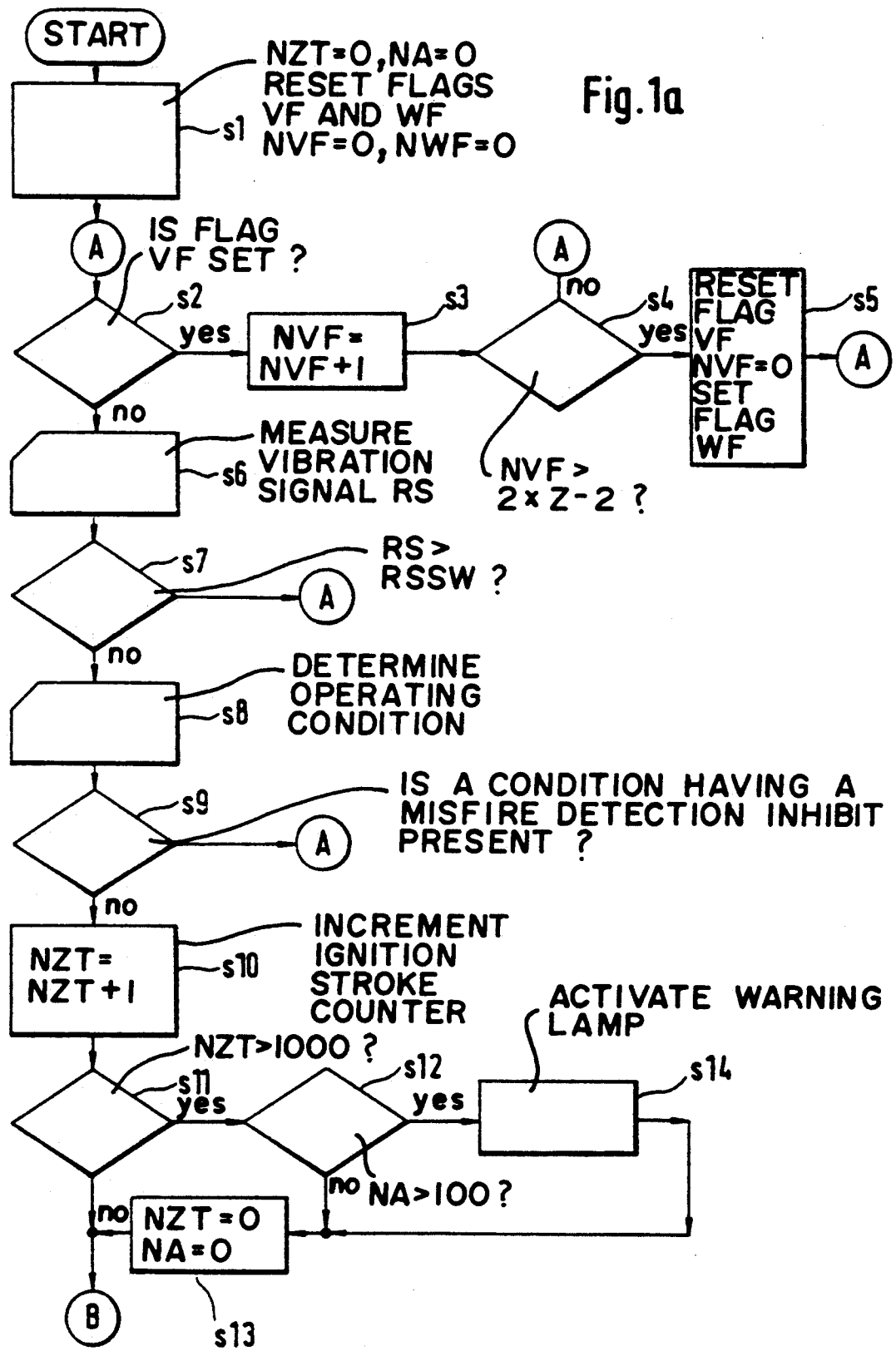
FIGS. 1a and 1b are flowcharts for explaining an embodiment of the method for determining misfires in an internal combustion engine of a motor vehicle wherein several conditions are investigated with the misfire determination being discontinued when one of the conditions is satisfied; and, FIG. 2 is a schematic representation of a motor vehicle including: an internal combustion engine, a vibration sensor mounted on the chassis and a control apparatus which operates for determining misfires in the engine.
Figure 1B:
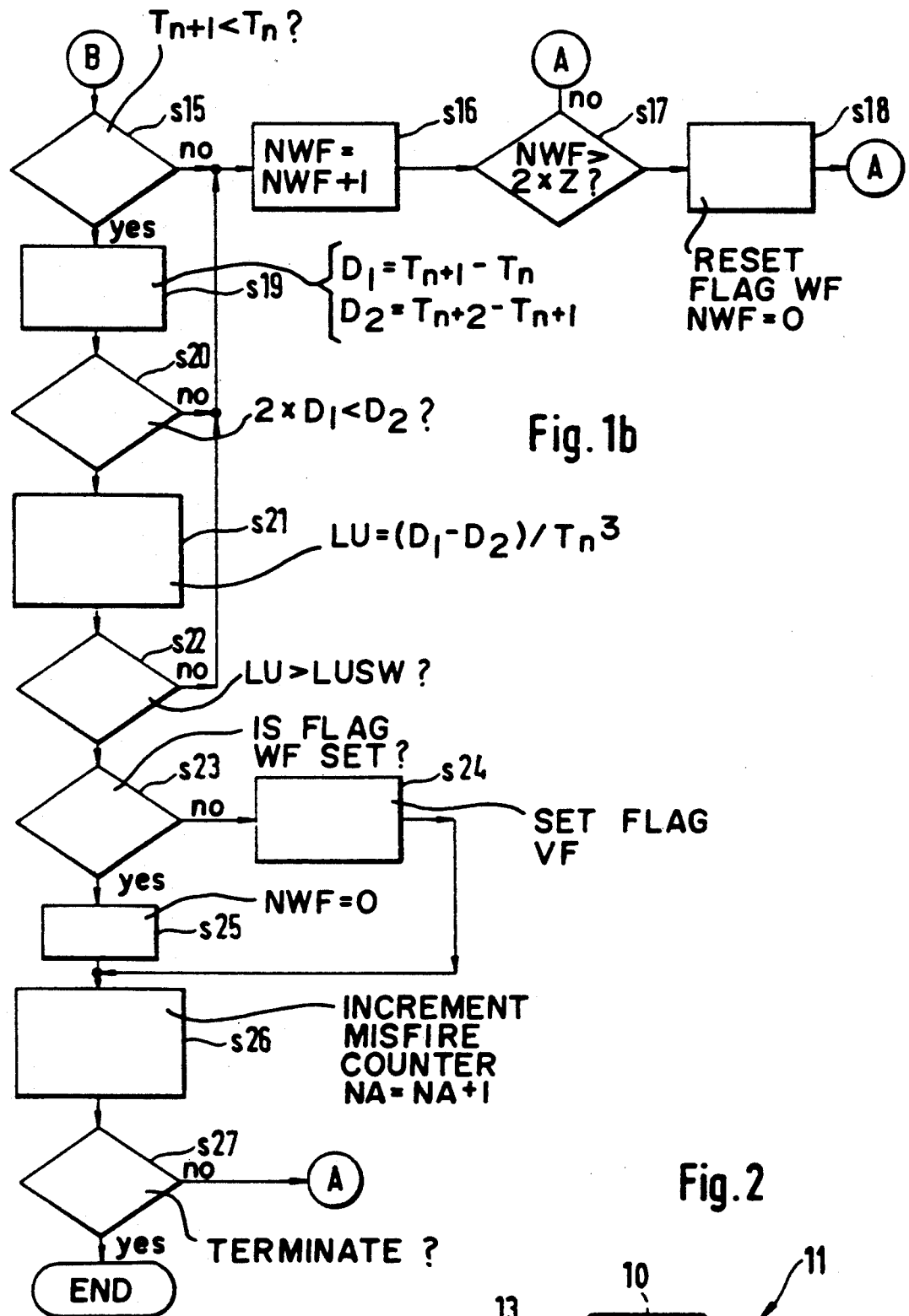

The embodiment of FIGS. 1a and 1b is directed to a misfire detection method which utilizes signals of a time counter and signals of a crankshaft angle sensor. Crankshaft angle sectors lie symmetrically with respect to top dead center of a cylinder in advance of its ignition stroke. In a four-cylinder engine, the sector extends 90° ahead of top dead center to 90° therebeyond. The time counter measures the particular time span $T_n$ within which the above-mentioned sector is passed through referred to the particular ignition stroke (n). If a misfire takes place, the measured time span is hardly extended relative to the particular time span which was measured referred to the previous ignition stroke However, the time span $T_{n+1}$ is extended for the following ignition stroke and also then when, in the following ignition stroke, no misfire occurs. The difference $D_1 = T_{n+1} - T_n$ is used as a measure for judging whether a misfire is present. The above-mentioned difference must be zero without misfires and without accelerations and decelerations. A second difference $D_2 = T_{n+2} - T_{n+1}$ is formed in order to distinguish effects caused by accelerations or decelerations from effects caused by misfires For linear accelerations and decelerations, both differences $D_1$ and $D_2$ are equal but not with misfires. The difference between the two differences is therefore an improved measure for the running roughness. This roughness is computed as $LU = (D_1 - D_2)/T_n^3$. The rough-running value computed in this manner is then compared to a threshold value LUSW. If the computed value exceeds the threshold value then this is evaluated as an indication for the presence of a misfire.

It is noted that in the description of the method above for determining a misfire, it is only the basic principle of a variation of methods wherein the time spans are measured within which the pregiven crankshaft angle sectors are passed through. More complete descriptions are provided, for example, in published German patent applications 3,917,978 and 3,615,547. However, in the following, reference is made to the above-described basic method.

After the start of the method according to FIGS. 1a and 1b, various initializations are made in a step s1. Four count values are each set to zero, namely, an ignition stroke count value NZT, a misfire count value NA, an inhibit ignition stroke count value NVF and a delay-ignition stroke-count value NWF. An inhibit flag VF and a delay flag WF are reset. This first step is not reached again in the further sequence of the method. After step s1 a mark (A) follows which defines the loop return position for the method sequence described in the following.

A step s2 follows the loop return mark (A) wherein a check is made as to whether the inhibit flag VF is set. After the start or also then when a specific delay condition is no longer satisfied, the inhibit flag is not set. In the following, an explanation is provided as to how this inhibit flag is set and reset in connection with a delay flag and how the delay flag itself is set and reset in parallel hereto. For this purpose, it is first assumed that continuous misfires occur for a specific cylinder. In this connection, it is noted that the sequence according to FIGS. 1a and 1b is run through separately for each cylinder of the engine.

If in step s2, it is determined that the inhibit flag VF is not set, then a number of further steps follows until, finally in a step s22, the above-mentioned comparison between the rough-running value LU and the threshold value LUSW is carried out and the result is obtained that the threshold is exceeded, that is, a misfire is present. In this case, a check is made in a following step s23 as to whether the delay flag WF is set. After the start of the method, this is not the case, since this flag had been reset in step s1. In the case of a non-set delay flag, the inhibit flag VW is set in a step s24. Then further steps follow (which are presently not of interest) until a check is finally made in a step s27 as to whether the method should be ended, for example, because the ignition of the engine has been switched off.

If the method is not to be ended, then the sequence returns to mark (A). The step s2 follows again as the first step after this mark wherein a check is made as to whether the inhibit flag VW is set. This time, the set condition is determined whereupon a step s3 follows in which the inhibit ignition stroke count value NVF is incremented by one. Thereafter, in step s4, a check is made as to whether this count value has exceeded a threshold value. In the embodiment, the threshold value is the value $2 \times Z - 2$ wherein Z is the number of cylinders. According to the sequence described above, the count value only stands at (1). In this case, the mark (A) is reached again. The sequence of steps s2 to s4 follows as long as the above-mentioned count value is below the above-mentioned threshold value. However, when the threshold value is exceeded, the following occurs: the inhibit flag is reset in a step s5, the inhibit ignition stroke count value NVF is again set to zero and the delay flag is set. Thereafter, there is a return to the mark (A). Since the inhibit flag is no longer set, the method again runs through up to step s23 (because according to the assumption, misfires are present continuously), in which a check is again made as to whether the delay flag is set. This time, this flag is set which leads to the condition that the step s24 no longer follows with the setting of the inhibit flag; instead, a step s25 follows wherein the delay-ignition stroke-count value NWF is set to zero. Thereafter, a step s26 follows wherein the misfire count value NA is incremented. It is now assumed that misfires no longer occur and that this is only determined in the above-mentioned step s22 in which the rough-running value is compared to the rough-running threshold. From the comparison, it now results that no misfire is present, whereupon, in lieu of step s23, a step s16 is reached wherein the delay-ignition stroke-count value NWF is incremented. In a step s17, a check is made as to whether this count value exceeds a threshold. In the embodiment, the threshold assumes the value $2 \times Z$. The count value is only at (1) in accordance with the sequence up to now. For this reason, the method returns to the mark (A). With further run-throughs without misfire, a return to mark (A) always occurs after step s17 until the situation occurs in the above-mentioned step that the count value NWF has exceeded the above-mentioned threshold. The delay flag is now reset and the count value NWF is set to zero. Accordingly, the same condition is present as at the start of the method. If a misfire occurs again before the count value NWF has exceeded the threshold., then, after step s22, step s23 is again reached in lieu of step s16 and, since the delay flag is still set, the count value NWF is again set to zero in step s25.

The sequence described above is advantageous for the following reasons. If a misfire occurs, it often leads to engine oscillations which can easily lead to the condition that a value adjusts which points to a misfire during the investigation of time spans in which a pregiven crankshaft angle sector is passed through. This happens even though the value is not caused by a misfire but instead by the consequent oscillation of a misfire. For a misfire which occurs only once, setting the inhibit flag for a pregiven number of ignition strokes ensures that further evaluations are only undertaken when the vibrations are attenuated to the extent that they no longer present the danger of faulty measurements. It is advantageous that the set inhibit flag is used for the purpose that the method returns again to its start without any complexity as to computations. Accordingly, a plurality of measurements and evaluations are unnecessary which will be explained further below.

If the inhibit flag would be set not only for individual misfires but also for continuous misfires, this would have the consequence that for a case of continuous misfires, a misfire is not counted with each ignition stroke which is required; instead, only every $2 \times Z - 1$ ignition strokes. The delay flag is utilized to make possible the counting of each misfire in the case of continuous misfires. In its set condition, this delay flag shows that previously the misfire detection was inhibited for a pregiven number of ignition strokes. If further ignition misfires occur, the set delay flag prevents the condition that the inhibit flag is again set. In this way, each misfire can be counted. However, if a single misfire occurred, then the count value for measuring the delay period is increased with each ignition stroke until, finally, a value is reached which leads to the reset of the delay flag. Thereafter, the inhibit flag can be set again when a misfire occurs first after several ignition strokes without misfires.

As explained above, the flowchart of FIGS. 1a and 1b applies in principle for the misfire detection for a single cylinder. If, in connection with step s26, the condition is present that the misfire counter is incremented, this is then understood to mean that the misfire counter is provided for a pregiven cylinder of the above-mentioned four cylinders. One misfire counter operates for each cylinder independently of the misfire counters for the other cylinders. It is a very different case for the counter for detecting the inhibit ignition strokes NVF and the counter for detecting the delay ignition strokes NWF. These counters are counted up with each ignition stroke of the engine without consideration of the cylinder which just then is in the ignition stroke.

The steps s6 to s21 have not yet been discussed individually and they lie between the steps already mentioned. The following then is directed to the steps s6 to s21.

If in step s2, the inhibit flag VF is not set, then a vibration signal RS is interrogated in a step s6 and evaluated. Preferably, the signal of concern here is that of an acceleration sensor mounted on the chassis of the motor vehicle. This signal is integrated with the integration value being a measure for the vibration. With this integration, the condition is precluded that an individual intense blow can lead to an indication of vibration. If the vibration signal RS exceeds a threshold value RSSW, which is checked in a step s7, the probability is great in the method described that forces are transmitted to the engine from the drive wheels via the transmission chain which lead to such fluctuations in the measured sector time spans that a conclusion could be erroneously drawn that a misfire is present. Accordingly, there is a return immediately to mark (A). Two advantages are simultaneously realized with this measure. Computation time is saved because numerous further method steps are unnecessary and the reliability of misfire detection is increased.

If, in step s7, the conclusion is reached that the vehicle does not vibrate so intensely that foreign forces could falsely indicate the presence of misfires, then the operating condition in which the engine is operating is detected in a step s8. In a step s9, the detected operating condition is compared to forbidden operating regions. It has been shown that a misfire recognition serves little purpose in various operating regions. Included herein are for example fast changing loads. This can be the rotation of a throttle flap by 90° within less than one half of a second. Also critical are rapid engine speed changes such as occur with the engagement and disengagement of the clutch. The case of engine start has already been mentioned as an operating region wherein the misfire detection can be purposefully discontinued. The misfire detection should also be discontinued in operating regions having engine speed limitation. This limitation takes place, typically, by artificially generating misfires. Very low engine speeds are likewise critical such as below 500 rpm as they are present for example when driving in high gear at low speeds. Such misfires do not bear any relationship to a fault of the engine which should be detected as fast as possible. Instead, they have to do with driving errors. Furthermore, it serves little purpose to detect misfires generally during overrun operation. If it develops in a step s9 that one of the above operating regions is present then a further misfire determination sequence is discontinued and the method returns in this case to the mark (A). The advantages obtained from steps s8 and s9 are the same as those which were obtained by means of the steps s6 and s7.

If in step s9, an operation condition is present wherein the further determination of misfires is basically purposeful, steps follow which are concerned with the evaluation of determined misfires. Before these steps are more carefully described, it is noted that misfires are then critical when they occur with a specific frequency.

The toxic gas content in the exhaust gas increases significantly when misfires occur for more than two ignition strokes. The catalyzer becomes endangered by fuel which is not combusted and which is burnt in the catalyzer when approximately 10% misfires occur. The frequency H of misfires indicates how many misfires NA take place within a pregiven number of ignition strokes. In the embodiment, 1000 ignition strokes are utilized for comparison. This is not the number of ignition strokes only for a single cylinder under consideration but instead it is the number of ignition strokes of all cylinders.

After these general explanations, the further sequence of the method according to step s9 can be considered. In step s10, the number of ignition strokes NZT is incremented. If in a step s11 it occurs that the above-mentioned number of 1000 ignition strokes is reached, a check is made in a step s12 as to whether the number NA of misfires is above 10% of the pregiven number of ignition strokes, in the example therefore, if over 100 misfires are present. If this is not the case, then in a step s13, the count value NZT for the ignition strokes and the count value NA for the misfires are both set to zero. Otherwise, a warning lamp is activated in a step s14.

In connection with the above, it is noted that a check is not made in the sequence described when a frequency value has already been exceeded which is relevant to the exhaust gas. Such a check can be made in correspondence to that explained above, however, with a second comparison frequency value which is lower than the value mentioned, for example, 20 in lieu of 100. However, when no such comparison takes place, the misfire count values for the individual cylinders can be evaluated, for example, in that a storage of the count values for the individual cylinders takes place with the storage of a fault indication together with the activation of the warning lamp. It can then be detected if too great a frequency input is caused by misfires in an individual cylinder or in several cylinders and which cylinder is affected or which cylinders are affected.

An important feature of the sequence described up till now is that the counting of the ignition strokes only takes place when it has been determined from the previous steps that an ignition stroke is concerned which is relevant for the detection of misfires. In previous methods, the ignition strokes were basically counted continuously that is, for example also in conditions in which no misfires can occur such as in overrun operation. In the embodiment, the actual evaluation of the measurements for determining misfires follows after the detection of ignition strokes and the frequency evaluation. It should be noted that the counting of the ignition strokes and the evaluation of the frequency can also take place after the last steps of the misfire determination. However, it is essential that the counting of ignition strokes only occurs after the complete investigations as to misfires have taken place.

The above-mentioned sequences for the final determination of misfires include steps s15 to s22 of which step s22 has already been discussed wherein the rough-running value LU is compared to a threshold. These method steps relate to the misfire determination method discussed initially with respect to the figures. In step s15, a check is made as to whether the sector time span $T_{n+1}$ for the ignition stroke n+1 is less than the sector time span $T_n$ for the ignition stroke (n). What is of concern here, as in the ignition strokes given below, is the ignition strokes which follow each other sequentially, that is, not with respect to ignition strokes which follow each other with respect to a selected cylinder. If in step s15, it develops that the sector time span for the ignition stroke n+1 is less than for the ignition stroke (n), then there is with certainty no misfire present and it is for this reason that further complicated determination steps are omitted and that the sequence returns to the mark (A); however, not directly, instead, by running through the steps s16 and s17 and, possibly also step s18 which, as explained above, is taken in connection with delay ignition strokes.

If the investigation in step s15 does not preclude that misfires are present, then in a following step s19, the above-mentioned differences $D_1$ and $D_2$ are computed and, in a step s20, a check is made as to whether twice the difference $D_1$ is less than the difference $D_2$. If this is not the case, then misfires are present in two cylinders which follow each other or in neither of the two cylinders. Since a decision cannot be made with certainty, which is actually the case, a return to mark (A) takes place again via the steps s16 and s17 and possibly step s18. In the above-mentioned decision case, a complicated investigation can however continue from step s20 which makes it possible to decide as to whether a multiple misfire or no misfire is present. The return to mark (A) takes place in this case only when it can be assumed that no misfire is present.

If the result is obtained in step s20 that a single misfire is apparently present, then the running-roughness value LU is computed in step s21 as explained at the beginning of the description of the figures. Then the comparison to the threshold for the rough-running value is made in step s22 as discussed several times above.

It is noted that all comparison values provided in this embodiment for each engine are to be applied so that the misfire can be determined with the least possible amount of computation. The matter of concern here is the comparisons in the steps s4, s7, s12, s17, s20 and s22. It is further noted that various investigations for different misfire detection methods are not required and that other investigations for other methods can be introduced. Thus, for example, for a misfire detection via combustion chamber pressures, it is of no purpose to evaluate vibration signals since practically no connection exists between the combustion chamber pressure and vibrations in the drive chain of the vehicle. If complicated misfire detection methods are used such as described in published German patent application 3,917,978 wherein groups of rough-running values are formed and these groups are subjected to a minimum/maximum check, still further basic conditions can investigated in addition to the investigations of steps s15 and s20. These basic conditions must be satisfied so that a misfire can be even present. A check is only then made as to whether the simply checkable basic conditions are satisfied before the complex actual determination of misfires takes place.

In one method for determining misfires in an internal combustion engine of a motor vehicle, the determination is discontinued starting with the occurrence of pregiven conditions until the pregiven conditions are no longer satisfied. Here, it must be distinguished between strictly logical conditions, driving conditions and operating conditions. A strictly logical condition is especially that which, after a misfire under specific further conditions, basically inhibits further determination of misfires for a given number of ignition strokes. An example of a driving condition wherein the determination of misfires is inhibited is driving over an uneven surface. Operating conditions wherein the determination is ended are, for example, rapid load and engine speed changes or very high or very low engine speeds.

If a misfire determination is not ended because a condition is satisfied, then a check is made as to whether simply determinable measured value relationships apply which make a misfire appear very improbable. The actual complicated misfire determination is ended if such measurement value relationships are present.

It is of special significance to count ignition strokes, which are counted to determine the relative frequency of misfires, only when the above-mentioned conditions are all satisfied which conditions determine whether a situation is present wherein misfires can be determined to serve a practical purpose. In this way, the decisive frequency determination is not influenced by the counting of ignition strokes which are not relevant to misfires.

The above procedure leads to a shortening of the average computation time because of the termination of the misfire detection in many cases wherein specific conditions are satisfied. Furthermore, the reliability of the detection of misfires is increased when the final determination of misfires only takes place when specific preconditions are satisfied.

Figure 2:
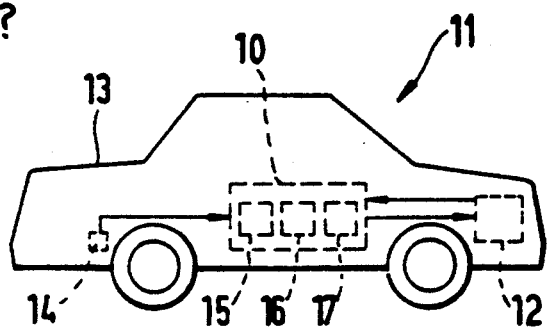

The methods described above take place in a control apparatus 10 which is mounted in a motor vehicle 11 as shown in FIG. 2. An internal combustion engine 12 and the control apparatus 10 are mounted in the motor vehicle 11. An accelerator sensor 14 is mounted on the chassis 13 as a vibration sensor which is connected to the control apparatus 10. The control apparatus 10 includes a means 15 for detecting misfires, a means 16 for detecting operating conditions and a means 17 for interrupting the misfire detection as long as pregiven operating conditions are present. The control apparatus 12 carries out the above-mentioned methods. For this purpose, additional means (not illustrated) are provided such as the various mentioned counters.

It is understood that the foregoing description is that of the preferred embodiments of the invention and that various changes and modifications may be made thereto without departing from the spirit and scope of the invention as defined in the appended claims.

What is claimed is:

1. A method for determining misfires in an internal combustion engine of a motor vehicle, the method comprising the steps of:
   first detecting misfires in the engine; and,
   discontinuing the detection of the misfires after the first misfire is detected for a predetermined inhibit tie span.

2. The method of claim 1, wherein a delay time span starts after said inhibit time span has elapsed; and, wherein the detection of additional misfires is not discontinued when an additional misfire occurs within said delay time span.

3. The method of claim 1, wherein the duration of said inhibit time span is defined by a pregiven number of ignition strokes.

4. The method of claim 3, wherein said delay time span is defined by a pregiven number of said ignition strokes.

5. The method of claim 1, the method comprising the further steps of: preliminary to the determination of misfires, checking to determine if a base condition is satisfied, which is satisfied with the greatest probability when a misfire is present; and, if the base condition is not satisfied, discontinuing the further determination of misfires.

6. The method of claim 5, wherein said base condition is $$kx(T_{n+1}-T_n)<(T_{n+2}-T_{n+1})$$

wherein:
   T = the tie span within which a crankshaft angle sector is passed over with said angle sector being symmetrical to top dead center ahead of an ignition stroke;
   n = the continuously advancing ignition stroke number; and,
   k = a factor preferably in the region about 2.

7. The method of claim 5, wherein the base condition is:

$$T_{n+1}=T_n<T_{n+2}-T_{n+1}$$

wherein:
   T = the time span within which a pregiven crankshaft angle sector is passed through by the crankshaft; and,
   n = the continuously advancing ignition stroke number.

8. The method of claim 1, further comprising the steps of: counting the total number of ignition strokes with a first counter and counting the total number of misfires with a second counter in order to determine the relative frequency of misfires from the count values; and, discontinuing the counting with the first counter as long as the misfire determination is discontinued.

9. An arrangement for determining misfires in an engine of a motor vehicle, the arrangement comprising:
   means for detecting misfires in the engine; and,
   means for discontinuing the detection of the misfires after the first misfire is detected for a predetermined inhibit time span.

* * * * *

UNITED STATES PATENT AND TRADEMARK OFFICE
CERTIFICATE OF CORRECTION

PATENT NO. : 5,231,869

DATED : August 3, 1993

INVENTOR(S) : Martin Klenk and Winfried Moser

It is certified that error appears in the above-identified patent and that said Letters Patent is hereby corrected as shown below:

In column 1, line 41: between "misfires" and "It", insert -- . --.

In column 3, line 1: between "mentioned" and the period, insert -- as an interrupting condition --.

In column 3, line 42: between "stroke" and "However", insert -- . --.

In column 3, line 52: between "misfires" and "For", insert -- . --.

In column 5, line 21: between "threshold" and "then", delete ".," and insert -- , -- therefor.

In column 6, line 50: between "critical" and "such", insert -- , --.

In column 6, line 51: between "rpm" and "as", insert -- , --.

UNITED STATES PATENT AND TRADEMARK OFFICE
CERTIFICATE OF CORRECTION

PATENT NO. : 5,231,869
DATED : August 3, 1993
INVENTOR(S) : Martin Klenk and Winfried Moser It is certified that error appears in the above-identified patent and that said Letters Patent is hereby corrected as shown below:

In column 8, line 51: between "can" and "investigated", insert -- be --.

In column 8, line 54: delete "be even" and substitute -- even be --.

In column 9, line 14: between "satisfied" and "which", insert -- as to --.

In column 9, line 53: delete "tie" and substitute -- time -- therefor.

In column 10, line 19: after "is", insert -- : --.

In column 10, line 23: delete "tie" and substitute -- time -- therefor.

Signed and Sealed this

Twenty-ninth Day of March, 1994

Attest:

BRUCE LEHMAN

*Attesting Officer*  *Commissioner of Patents and Trademarks*